(12) United States Patent
Chang et al.

(10) Patent No.: US 8,953,255 B2
(45) Date of Patent: Feb. 10, 2015

(54) IMAGING LENS AND ELECTRONIC APPARATUS HAVING THE SAME

(75) Inventors: Kuo-Wen Chang, Taichung (TW); Poche Lee, Taichung (TW); Sheng-Wei Hsu, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 197 days.

(21) Appl. No.: 13/617,632

(22) Filed: Sep. 14, 2012

(65) Prior Publication Data

US 2013/0258185 A1    Oct. 3, 2013

(30) Foreign Application Priority Data

Mar. 30, 2012 (TW) .............................. 101111479 A

(51) Int. Cl.
*G02B 9/60* (2006.01)
*G02B 13/18* (2006.01)
*G02B 13/00* (2006.01)

(52) U.S. Cl.
CPC .............. *G02B 13/0045* (2013.01); *G02B 9/60* (2013.01)
USPC .......................................... 359/714; 359/763

(58) Field of Classification Search
CPC ....... G02B 13/0045; G02B 13/18; G02B 9/60
USPC .................................. 359/713, 714, 763–765
See application file for complete search history.

(56) References Cited

U.S. PATENT DOCUMENTS

| 8,711,491 B2 * | 4/2014 | Chang et al. .................. 359/714 |
| 2011/0013069 A1 * | 1/2011 | Chen ............................. 348/335 |

FOREIGN PATENT DOCUMENTS

| TW | 201007340 A | 2/2010 |
| TW | 201102690 A | 1/2011 |

* cited by examiner

*Primary Examiner* — Scott J Sugarman
(74) *Attorney, Agent, or Firm* — Baker & McKenzie LLP

(57) ABSTRACT

An imaging lens includes first, second, third, fourth, and fifth lens elements arranged from an object side to an image side in the given order. The first, second, and third lens elements have positive, negative, and negative refractive powers, respectively. The third lens element has an image-side surface having a convex portion in a vicinity of a periphery of the third lens element. The fourth lens element has a concave object-side surface. The fifth lens element has an object-side surface that has a convex portion in a vicinity of an optical axis of the imaging lens, and an image-side surface that has a concave portion in a vicinity of the optical axis and a convex portion in a vicinity of a periphery of the fifth lens element.

17 Claims, 19 Drawing Sheets

| lens element | surface | radius of curvature | thickness | refracting power | dispersion coefficient | material | focal length |
|---|---|---|---|---|---|---|---|
| object | | ∞ | 600 | | | | |
| aperture stop 8 | | ∞ | -0.19900 | | | | |
| first lens element 3 | object-side surface 31 | 1.16048 | 0.49131 | 1.54593 | 56.11379 | plastic | 2.14808 |
| | image-side surface 32 | 94.66782 | 0.04338 | | | | |
| second lens element 4 | object-side surface 41 | 9.14362 | 0.25498 | 1.58900 | 29.92123 | plastic | -3.90593 |
| | image-side surface 42 | 1.81912 | 0.33392 | | | | |
| third lens element 5 | object-side surface 51 | 21.25202 | 0.27198 | 1.64023 | 23.90088 | plastic | -12.86834 |
| | image-side surface 52 | 5.90743 | 0.14667 | | | | |
| fourth lens element 6 | object-side surface 61 | -3.68915 | 0.53697 | 1.53635 | 56.27272 | plastic | 5.19858 |
| | image-side surface 62 | -1.66873 | 0.32598 | | | | |
| fifth lens element 7 | object-side surface 71 | 1.15293 | 0.35902 | 1.53635 | 56.27272 | plastic | -6.98681 |
| | image-side surface 72 | 0.78583 | 0.44397 | | | | |
| optical filter 9 | object-side surface 91 | ∞ | 0.30000 | | | | |
| | image-side surface 92 | ∞ | 0.354609 | | | | |
| image plane 10 | | | 3.86280 | | | | |
| system length | | | | | | | |

FIG. 2

| surface | 31 | 32 | 41 | 42 | 51 | 52 | 61 | 62 | 71 | 72 |
|---|---|---|---|---|---|---|---|---|---|---|
| K | 0.00000 | 0.00000 | 0.00000 | 0.00000 | 0.00000 | 0.00000 | 0.00000 | 0.00000 | -1.00000 | -1.00000 |
| $a_4$ | 0.00147 | -0.20804 | -0.29536 | -0.11594 | -0.40458 | -0.33878 | -0.14660 | -0.47776 | -1.26095 | -1.22315 |
| $a_6$ | 0.00230 | 1.08616 | 1.52386 | 0.72233 | -0.03363 | 0.04220 | -0.00281 | 1.36177 | 1.49417 | 1.81948 |
| $a_8$ | 0.06723 | -2.92160 | -3.92347 | -1.29317 | 0.87365 | 0.79012 | 0.33163 | -2.83705 | -1.11398 | -2.29758 |
| $a_{10}$ | -0.57513 | 4.18700 | 6.28252 | 2.06298 | -4.26185 | -1.92117 | 2.26405 | 4.71451 | 0.51454 | 2.29015 |
| $a_{12}$ | 1.42273 | -3.17531 | -5.73712 | -0.32160 | 8.07526 | 2.19313 | -7.96412 | -4.66350 | -0.12857 | -1.73048 |
| $a_{14}$ | -1.49372 | — | 1.59707 | -1.66406 | -4.67001 | -0.90370 | 10.41626 | 2.58051 | 0.00954 | 0.95898 |
| $a_{16}$ | — | — | — | 2.46671 | — | — | -6.49087 | -0.75347 | 0.00254 | -0.37885 |
| $a_{18}$ | — | — | — | — | — | — | 1.60931 | 0.09165 | -0.00052 | 0.10306 |
| $a_{20}$ | — | — | — | — | — | — | — | — | 0.0000204 | -0.01825 |
| $a_{22}$ | — | — | — | — | — | — | — | — | — | 0.00189 |
| $a_{24}$ | — | — | — | — | — | — | — | — | — | -0.0000860 |

FIG. 3

| lens element | surface | radius of curvature | thickness | refracting power | dispersion coefficient | material | focal length |
|---|---|---|---|---|---|---|---|
| object | | ∞ | 600 | | | | |
| aperture stop 8 | | ∞ | -0.19959 | | | | |
| first lens element 3 | object-side surface 31 | 1.16061 | 0.49070 | 1.54593 | 56.11379 | plastic | 2.07961 |
| | image-side surface 32 | -44.33209 | 0.04053 | | | | |
| second lens element 4 | object-side surface 41 | 12.66460 | 0.27074 | 1.61139 | 26.65149 | plastic | -3.47579 |
| | image-side surface 42 | 1.80495 | 0.31139 | | | | |
| third lens element 5 | object-side surface 51 | 17.29120 | 0.32817 | 1.64023 | 23.90088 | plastic | -26.79113 |
| | image-side surface 52 | 8.54700 | 0.18064 | | | | |
| fourth lens element 6 | object-side surface 61 | -2.94872 | 0.52325 | 1.53635 | 56.27272 | plastic | 4.59295 |
| | image-side surface 62 | -1.42531 | 0.28786 | | | | |
| fifth lens element 7 | object-side surface 71 | 1.31514 | 0.35000 | 1.53635 | 56.27272 | plastic | -4.99105 |
| | image-side surface 72 | 0.79995 | 0.44397 | | | | |
| optical filter 9 | object-side surface 91 | ∞ | 0.30000 | | | | |
| | image-side surface 92 | ∞ | 0.33378 | | | | |
| image plane 10 | | | 3.86103 | | | | |
| system length | | | | | | | |

FIG. 6

| surface | 31 | 32 | 41 | 42 | 51 | 52 | 61 | 62 | 71 | 72 |
|---|---|---|---|---|---|---|---|---|---|---|
| K | 0.00000 | 0.00000 | 0.00000 | 0.00000 | 0.00000 | 0.00000 | 0.00000 | 0.00000 | -0.95671 | -1.00343 |
| $a_4$ | 0.00316 | -0.17925 | -0.28229 | -0.13523 | -0.32351 | -0.26157 | -0.13580 | -0.361127 | -1.18560 | -1.19652 |
| $a_6$ | 0.00544 | 0.99749 | 1.50662 | 0.78816 | -0.20830 | -0.16599 | -0.10385 | 1.09561 | 1.42142 | 1.80430 |
| $a_8$ | 0.04494 | -2.66598 | -4.00027 | -1.32382 | 1.73956 | 1.26168 | -0.15223 | -2.37986 | -1.01072 | -2.30287 |
| $a_{10}$ | -0.43997 | 3.80301 | 6.75992 | 1.12567 | -6.61967 | -2.70913 | 4.94749 | 4.27418 | 0.39481 | 2.31723 |
| $a_{12}$ | 1.13722 | -2.95847 | -6.79420 | 3.93006 | 11.03105 | 2.84780 | -13.28654 | -4.36433 | -0.04490 | -1.76490 |
| $a_{14}$ | -1.29510 | — | 2.44558 | -9.32334 | -6.14817 | -1.11873 | 16.02606 | 2.42110 | -0.02503 | 0.98411 |
| $a_{16}$ | — | — | — | 7.54568 | — | — | -9.65787 | -0.69696 | 0.01081 | -0.39058 |
| $a_{18}$ | — | — | — | — | — | — | 2.35943 | 0.08311 | -0.00157 | 0.10661 |
| $a_{20}$ | — | — | — | — | — | — | — | — | 0.0000745 | -0.01892 |
| $a_{22}$ | — | — | — | — | — | — | — | — | — | 0.00196 |
| $a_{24}$ | — | — | — | — | — | — | — | — | — | -0.0000893 |

FIG. 7

| lens element | surface | radius of curvature | thickness | refracting power | dispersion coefficient | material | focal length |
|---|---|---|---|---|---|---|---|
| object | | ∞ | 600 | | | | |
| aperture stop 8 | | ∞ | -0.20111 | | | | |
| first lens element 3 | object-side surface 31 | 1.15487 | 0.48321 | 1.54593 | 56.11379 | plastic | 2.18195 |
| | image-side surface 32 | 32.27343 | 0.03467 | | | | |
| second lens element 4 | object-side surface 41 | 6.64626 | 0.28783 | 1.64023 | 23.90088 | plastic | -3.77022 |
| | image-side surface 42 | 1.74078 | 0.31429 | | | | |
| third lens element 5 | object-side surface 51 | 13.86996 | 0.35250 | 1.64023 | 23.90088 | plastic | -54.04298 |
| | image-side surface 52 | 9.80274 | 0.17252 | | | | |
| fourth lens element 6 | object-side surface 61 | -2.43335 | 0.55855 | 1.53635 | 56.27272 | plastic | 4.87120 |
| | image-side surface 62 | -1.36088 | 0.19810 | | | | |
| fifth lens element 7 | object-side surface 71 | 1.21318 | 0.35000 | 1.53635 | 56.27272 | plastic | -5.45069 |
| | image-side surface 72 | 0.77103 | 0.44397 | | | | |
| optical filter 9 | object-side surface 91 | ∞ | 0.30000 | | | | |
| | image-side surface 92 | ∞ | 0.40421 | | | | |
| image plane 10 | | | 3.89997 | | | | |
| system length | | | | | | | |

FIG. 10

| surface | 31 | 32 | 41 | 42 | 51 | 52 | 61 | 62 | 71 | 72 |
|---|---|---|---|---|---|---|---|---|---|---|
| K | 0.00000 | 0.00000 | 0.00000 | 0.00000 | 0.00000 | 0.00000 | 0.00000 | 0.00000 | -0.9689 | -0.99987 |
| $a_4$ | 0.00756 | -0.16948 | -0.22995 | -0.07646 | -0.28243 | -0.22007 | -0.04319 | -0.40172 | -1.27755 | -1.25726 |
| $a_6$ | -0.05901 | 0.86488 | 1.09842 | 0.44893 | -0.16571 | -0.19099 | -0.40175 | 1.38437 | 1.695174 | 1.95977 |
| $a_8$ | 0.53506 | -2.27859 | -2.63234 | 0.19396 | 1.08829 | 0.97408 | 0.77813 | -3.11628 | -1.42285 | -2.58148 |
| $a_{10}$ | -2.24699 | 3.27170 | 4.12389 | -3.77841 | -4.64106 | -2.01959 | 2.63607 | 5.49424 | 0.762781 | 2.68740 |
| $a_{12}$ | 4.29404 | -2.68319 | -3.94596 | 14.64758 | 8.04561 | 2.14920 | -9.54984 | -5.65623 | -0.248 | -2.12623 |
| $a_{14}$ | -3.39130 | – | 1.08212 | -22.41156 | -4.45971 | -0.86457 | 12.56053 | 3.26199 | 0.044495 | 1.23560 |
| $a_{16}$ | – | – | – | 14.10455 | – | – | -8.04628 | -1.00090 | -0.00341 | -0.51172 |
| $a_{18}$ | – | – | – | – | – | – | 2.08572 | 0.13009 | -0.0000137 | 0.14569 |
| $a_{20}$ | – | – | – | – | – | – | – | – | 0.00000626 | -0.02693 |
| $a_{22}$ | – | – | – | – | – | – | – | – | – | 0.00290 |
| $a_{24}$ | – | – | – | – | – | – | – | – | – | -0.000137 |

FIG. 11

| lens element | surface | radius of curvature | thickness | refracting power | dispersion coefficient | material | focal length |
|---|---|---|---|---|---|---|---|
| object | | ∞ | 600 | | | | |
| aperture stop 8 | | ∞ | −0.31147 | | | | |
| first lens element 3 | object-side surface 31 | 1.11585 | 0.48257 | 1.54593 | 56.1138 | plastic | 2.17070 |
| | image-side surface 32 | 16.19088 | 0.10000 | | | | |
| second lens element 4 | object-side surface 41 | 7.44396 | 0.21999 | 1.64023 | 23.9009 | plastic | −3.70439 |
| | image-side surface 42 | 1.77787 | 0.30322 | | | | |
| third lens element 5 | object-side surface 51 | −12.17605 | 0.26816 | 1.64023 | 23.9009 | plastic | −538.48149 |
| | image-side surface 52 | −12.73033 | 0.25603 | | | | |
| fourth lens element 6 | object-side surface 61 | −2.31373 | 0.51727 | 1.53635 | 56.2727 | plastic | 4.13167 |
| | image-side surface 62 | −1.22026 | 0.10000 | | | | |
| fifth lens element 7 | object-side surface 71 | 1.91486 | 0.43394 | 1.53635 | 56.2727 | plastic | −3.98830 |
| | image-side surface 72 | 0.93046 | 0.43256 | | | | |
| optical filter 9 | object-side surface 91 | ∞ | 0.30000 | | | | |
| | image-side surface 92 | ∞ | 0.49212 | | | | |
| image plane 10 | | | | | | | |
| system length | | | 3.90586 | | | | |

FIG. 14

| surface | 31 | 32 | 41 | 42 | 51 | 52 | 61 | 62 | 71 | 72 |
|---|---|---|---|---|---|---|---|---|---|---|
| K | 0.00000 | 0.00000 | 0.00000 | 0.00000 | 0.00000 | 0.00000 | 0.00000 | -1.0591 | -1.0591 | -1.0591 |
| $a_4$ | -0.0053867 | -0.14830 | -0.29959 | -0.17108 | -0.37937 | -0.26249 | 0.098948 | -0.35054 | -0.35054 | -0.35054 |
| $a_6$ | 0.25063 | 1.73796 | 1.3972 | 0.90390 | 0.22401 | 0.027629 | -0.87416 | 1.2828 | 1.2828 | 1.2828 |
| $a_8$ | -2.4339 | -1.7755 | -3.7112 | -0.92224 | -0.64514 | 0.41985 | 2.5466E | -3.2290 | -3.2290 | -3.2290 |
| $a_{10}$ | 15.111 | 2.3884 | 6.6655 | -1.7473 | 5.1863 | 1.1688 | -3.8644 | 5.8108 | 5.8108 | 5.8108 |
| $a_{12}$ | -59.133 | -1.9187 | -8.1498 | 9.6450 | -16.983 | -5.0662 | 7.0568 | -5.9468 | -5.9468 | -5.9468 |
| $a_{14}$ | 148.71 | – | 4.2846 | -10.888 | 23.659 | 6.1102 | -13.668 | 3.0306 | 3.0306 | 3.0306 |
| $a_{16}$ | -234.87 | – | – | -5.7499 | -11.441 | -2.5152 | 16.114 | -0.23045 | -0.23045 | -0.23045 |
| $a_{18}$ | 2.13.18 | – | – | 18.909 | -1.1728 | – | -9.6835 | -0.55458 | -0.55458 | -0.55458 |
| $a_{20}$ | -85.757 | – | – | – | – | – | 2.3166 | 0.27040 | 0.27040 | 0.27040 |
| $a_{22}$ | – | – | – | – | – | – | – | -0.041184 | -0.041184 | -0.041184 |
| $a_{24}$ | – | – | – | – | – | – | – | – | – | – |

FIG. 15

| relationship | first preferred embodiment | second preferred embodiment | third preferred embodiment | fourth preferred embodiment |
|---|---|---|---|---|
| $T_2/G_{all-air}$ | 0.30000 | 0.33000 | 0.40000 | 0.28975 |
| $T_3/G_{all-air}$ | 0.32000 | 0.40000 | 0.49000 | 0.35319 |
| $\|\nu_2 - \nu_3\|$ | 6.02035 | 2.75061 | 0 | 0 |
| $f_4/G_{all-air}$ | 6.11636 | 5.59827 | 6.76944 | 5.44178 |

FIG. 17

IMAGING LENS AND ELECTRONIC APPARATUS HAVING THE SAME

CROSS-REFERENCE TO RELATED APPLICATION

This application claims priority of Taiwan Patent Application No. 10111479, filed on Mar. 30, 2012, the contents of which are hereby incorporated by reference in their entirety for all purposes.

BACKGROUND OF THE INVENTION

1. Field of the Invention

The present invention relates to an imaging lens and an electronic apparatus, more particularly to an imaging lens having five lens elements and an electronic apparatus having the same.

2. Description of the Related Art

In recent years, as use of portable electronic devices (e.g., mobile phones and digital cameras) becomes ubiquitous, much effort has been put into reducing dimensions of portable electronic devices. As dimensions of charged coupled device (CCD) and complementary metal-oxide semiconductor (CMOS) based optical sensors are reduced, dimensions of imaging lens for use with the optical sensors must be correspondingly reduced without significantly compromising optical performance.

In view of the above: U.S. Pat. No. 7,480,105 discloses a conventional imaging lens with five lens elements, of which the first, second, and third lens elements have negative, positive, and negative refractive powers, respectively; U.S. Pat. No. 7,639,432 discloses a conventional imaging lens with five lens elements, of which the first, second, and third lens elements have negative, positive, and positive refractive powers, respectively; and each of U.S. Pat. Nos. 7,486,449 and 7,684,127 discloses a conventional imaging lens with five lens elements, of which the first, second, and third lens elements have negative, negative, and positive refractive powers, respectively. However, the above conventional imaging lenses have system lengths ranging from 10 mm to 18 mm, which may be too long for use in certain miniaturized electronic apparatuses.

Moreover, each of U.S. Patent Application Publication Nos. 2011/0013069 and 2011/0249346 and U.S. Pat. No. 8,000,030 discloses a conventional imaging lens with a system length of approximately 6 mm, and having five lens elements, of which the first, second, and third lens elements have positive, negative, and negative refractive powers, respectively. However, due to surface configurations of the third, fourth, and fifth lens elements of each of the conventional imaging lenses, a satisfactory tradeoff between system length and aberration of the conventional imaging lens may be difficult to achieve. In other words, without significantly compromising the imaging quality, the system lengths of the conventional imaging lenses may not be effectively reduced.

SUMMARY OF THE INVENTION

An object of the present invention is to provide an imaging lens having a shorter overall length while maintaining good optical performance.

An imaging lens of the present invention includes first, second, third, fourth, and fifth lens elements arranged from an object side to an image side in the given order. The first lens element has a positive refractive power. The second lens element has a negative refractive power. The third lens element has a negative refractive power, and has an image-side surface that faces toward the image side and that has a first convex portion in a vicinity of a periphery of the third lens element. The fourth lens element has an object-side surface facing toward the object side, the object-side surface of the fourth lens element being a concave surface. The fifth lens element has an object-side surface and an image-side surface that face toward the object side and the image side, respectively. The object-side surface of the fifth lens element has a convex portion in a vicinity of an optical axis of the imaging lens. The image-side surface of the fifth lens element has a concave portion in a vicinity of the optical axis and a convex portion in a vicinity of a periphery of the fifth lens element.

The imaging lens does not include any lens element with refractive power other than the first, second, third, fourth, and fifth lens elements.

Another object of the present invention is to provide an electronic apparatus having an imaging lens with five lens elements.

An electronic apparatus of the present invention includes a housing and an imaging module. The imaging module is disposed in the housing, and includes the imaging lens of the present invention, a barrel whereat the imaging lens is disposed, a holder unit on which the barrel is disposed, a substrate on which the holder unit is disposed, and an image sensor disposed on the substrate and at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical equation corresponding to the imaging lens of the first preferred embodiment;

FIG. 6 shows values of some optical parameters corresponding to the imaging lens of the second preferred embodiment;

FIG. 7 shows values of some parameters of the optical equation corresponding to the imaging lens of the second preferred embodiment;

FIG. 10 shows values of some optical parameters corresponding to the imaging lens of the third preferred embodiment;

FIG. 11 shows values of some parameters of the optical equation corresponding to the imaging lens of the third preferred embodiment;

FIG. 14 shows values of some optical parameters corresponding to the imaging lens of the fourth preferred embodiment;

FIG. 15 shows values of some parameters of the optical equation corresponding to the imaging lens of the fourth preferred embodiment;

FIG. 17 is a table that shows values of parameters of other optical relationships corresponding to the imaging lenses of the first, second, third, and fourth preferred embodiments;

DETAILED DESCRIPTION OF THE PREFERRED EMBODIMENTS

Figure 1:
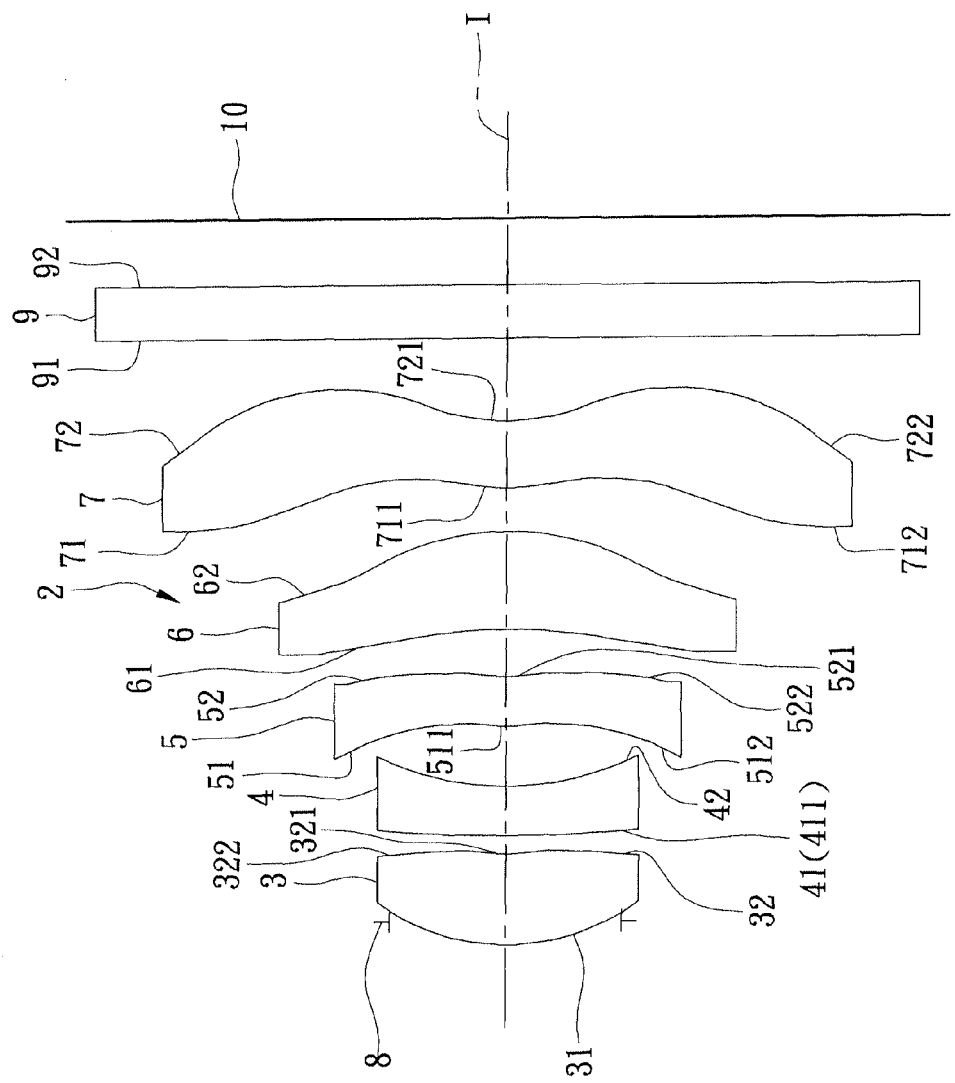
FIG. 1 is a schematic diagram that illustrates the first preferred embodiment of an imaging lens according to the present invention.

Before the present invention is described in greater detail, it should be noted that like elements are denoted by the same reference numerals throughout the disclosure.

Referring to FIG. 1, the first preferred embodiment of an imaging lens 2 of the present invention includes an aperture stop 8, first, second, third, fourth, and fifth lens elements 3-7, and an optical filter 9 arranged in the given order along an optical axis (I) from an object side to an image side. The optical filter 9 is an infrared cut filter for reducing the transmission of infrared light to thereby reduce color aberration of images formed at an image plane 10.

Each of the first, second, third, fourth, and fifth lens elements 3-7 and the optical filter 9 has an object-side surface 31, 41, 51, 61, 71, 91 facing toward the object side, and an image-side surface 32, 42, 52, 62, 72, 92 facing toward the image side. Light entering the imaging lens 2 travels through the aperture stop 8, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 91, 92 of the optical filter 9, in the given order, to form an image on the image plane 10.

The first lens element 3 has a positive refractive power, the object-side surface 31 thereof is a convex surface, and the image-side surface 32 thereof has a concave portion 321 that is in a vicinity of the optical axis (I) and a convex portion 322 that is in a vicinity of a periphery of the first lens element 3.

The second lens element 4 has a negative refractive power, the object-side surface 41 thereof is a convex surface having a convex portion 411 in a vicinity of a periphery of the second lens element 4, and the image-side surface 42 thereof is a concave surface.

The third lens element 5 has a negative refractive power, the object-side surface 51 thereof has a convex portion 511 in a vicinity of the optical axis (I) and a concave portion 512 in a vicinity of a periphery of the third lens element 5, and the image-side surface 52 thereof has a concave portion 521 in a vicinity of the optical axis (I) and a convex portion 522 in a vicinity of the periphery of the third lens element 5.

The fourth lens element 6 has a positive refractive power, the object-side surface 61 thereof is a concave surface, and the image-side surface 62 thereof is a convex surface.

The fifth lens element 7 has a negative refractive power. The object-side surface 71 of the fifth lens element 5 has a first convex portion 711 in a vicinity of the optical axis (I) and a second convex portion 712 in a vicinity of a periphery of the fifth lens element 7. The image-side surface 72 of the fifth lens element 5 has a concave portion 721 in a vicinity of the optical axis (I) and a convex portion 722 in a vicinity of the periphery of the fifth lens element 7.

The imaging lens 2 of the present invention does not include any lens element with refractive power other than the abovementioned first, second, third, fourth, and fifth lens elements 3-7, which are made of plastic material in this embodiment. The object-side surfaces 31-71 and the image-side surfaces 32-72 of the lens elements 3-7 are aspherical in this embodiment. However, configurations of the object-side and image-side surfaces 31-71, 32-72 are not limited to such.

Relationships among some optical parameters corresponding to the first preferred embodiment are as follows:

$T_2/G_{all-air}=0.30$ $T_3/G_{all-air}=0.32$ $|v_2-v_3|=6.02035$ $f_4/G_{all-air}=6.11363$ where:

"$T_2$" represents a distance between the object-side and image-side surfaces 41, 42 of the second lens element 4 at the optical axis (I);

"$T_3$" represents a distance between the object-side and image-side surfaces 51, 52 of the third lens element at the optical axis (I)

"$v_2$" represents a dispersion coefficient of the second lens element 4;

"$v_3$" represents a dispersion coefficient of the third lens element 5;

"$G_{all-air}$" represents a sum of widths of a clearance between the image-side and object-side surfaces 32, 41 at the optical axis (I), a clearance between the image-side and object-side surfaces 42, 51 at the optical axis (I), a clearance between the image-side and object-side surfaces 52, 61 at the optical axis (I), and a clearance between the image-side and object-side surfaces 62, 71 at the optical axis (I) (i.e., "$G_{all-air}$" represents a sum of widths of clearances among the imaging lenses 3-7); and "$f_4$" represents a focal length of the fourth lens elements 6.

The imaging lens 2 of the first preferred embodiment has an overall system focal length of 3.27004 mm and a half field-of-view (HFOV) of 35.12°. Shown in FIG. 2 is a table that shows values of some optical parameters corresponding to the surfaces 31-71, 32-72 of the first preferred embodiment.

Each of the object-side surfaces 31-71 and the image-side surfaces 32-72 satisfies the optical equation of $$X(Y) = \frac{Y^2}{R} \bigg/ \left(1 + \sqrt{1-(1+K)\frac{Y^2}{R^2}}\right) + \sum_{i=1} a_{2i} \times Y^{2i}$$

where:

"X" represents a distance from a tangential plane, which is tangent to a point of the surface intersecting with the optical axis (I), to an arbitrary point of the surface;

"Y" represents a distance between the arbitrary point of the surface and the optical axis (I);

"R" represents a radius of curvature of the surface;

"K" represents a conic constant of the surface; and

"$a_{2i}$" represents a $2i^{th}$-order coefficient of the surface.

Shown in FIG. 3 is a table that shows values of some optical parameters of the above optical equation corresponding to the first preferred embodiment.

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 4:
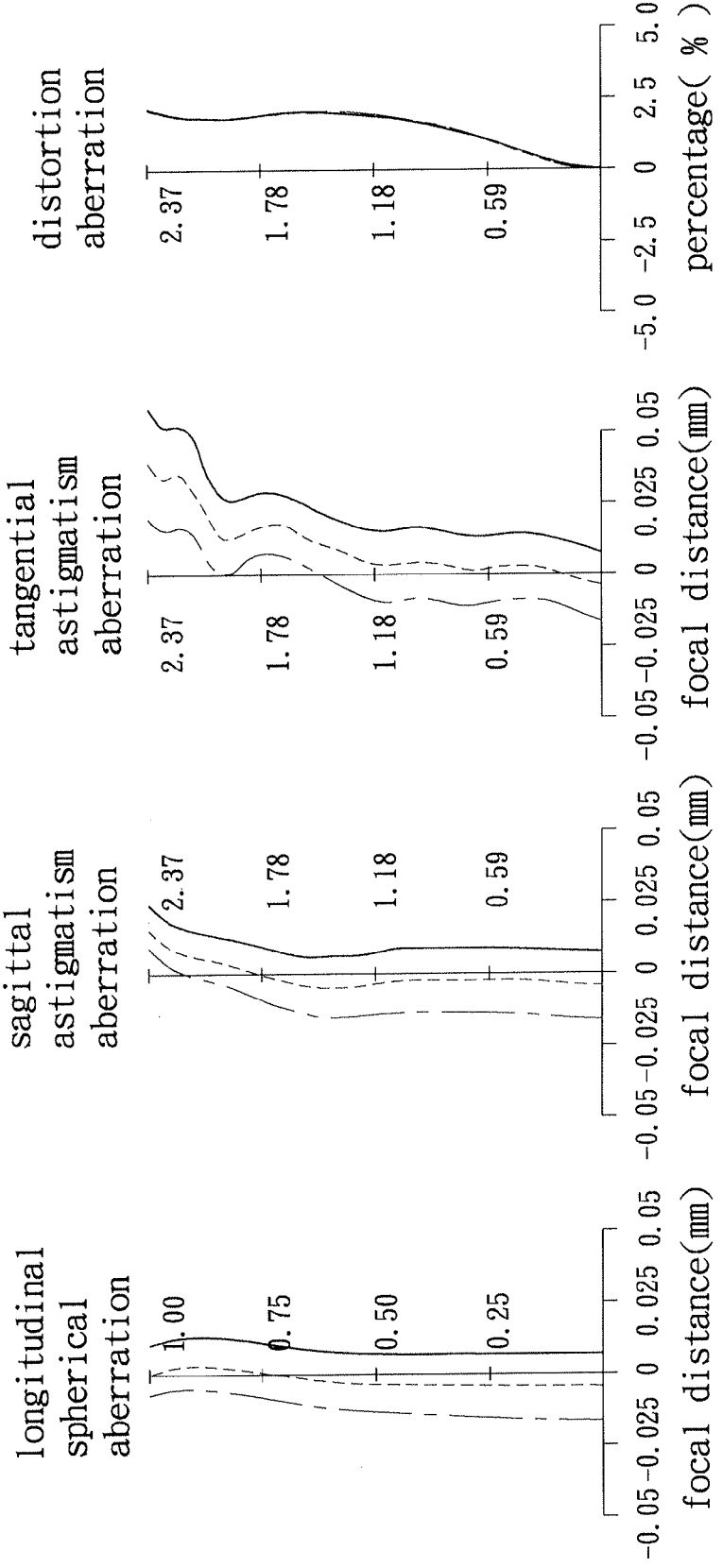
FIGS. 4(a) to 4(d) show different optical characteristics of the imaging lens of the first preferred embodiment.

It can be understood from FIG. 4(a) that, since each of the curves corresponding to longitudinal spherical aberration has a focal length at each field of view (indicated by the vertical axis) that falls within the range of ±0.01 mm, the first preferred embodiment is able to achieve a relatively low spherical aberration at each of the wavelengths. Furthermore, since a deviation in focal length among the curves at each field of view does not exceed the range of ±0.02 mm, the first preferred embodiment has a relatively low chromatic aberration.

It can be understood from FIGS. 4(b) and 4(c) that, since each of the curves corresponding to sagittal astigmatism aberration falls within the range of ±0.06 mm of focal length, and each of the curves corresponding to tangential astigmatism aberration falls within the range of ±0.025 mm of focal length, the first preferred embodiment has a relatively low optical aberration. Further, since a difference among the curves in FIG. 4(b) and a difference among the curves in FIG. 4(c) are relatively small, the first preferred embodiment has a relatively reduced distortion.

Moreover, as shown in FIG. 4(d), since each of the curves corresponding to distortion aberration falls within the range of ±2.5%, the first preferred embodiment is able to meet requirements in imaging quality of most optical systems.

In view of the above, with the system length reduced down to below 4 mm, the imaging lens 2 of the first preferred embodiment is still able to achieve a relatively good optical performance.

Figure 5:
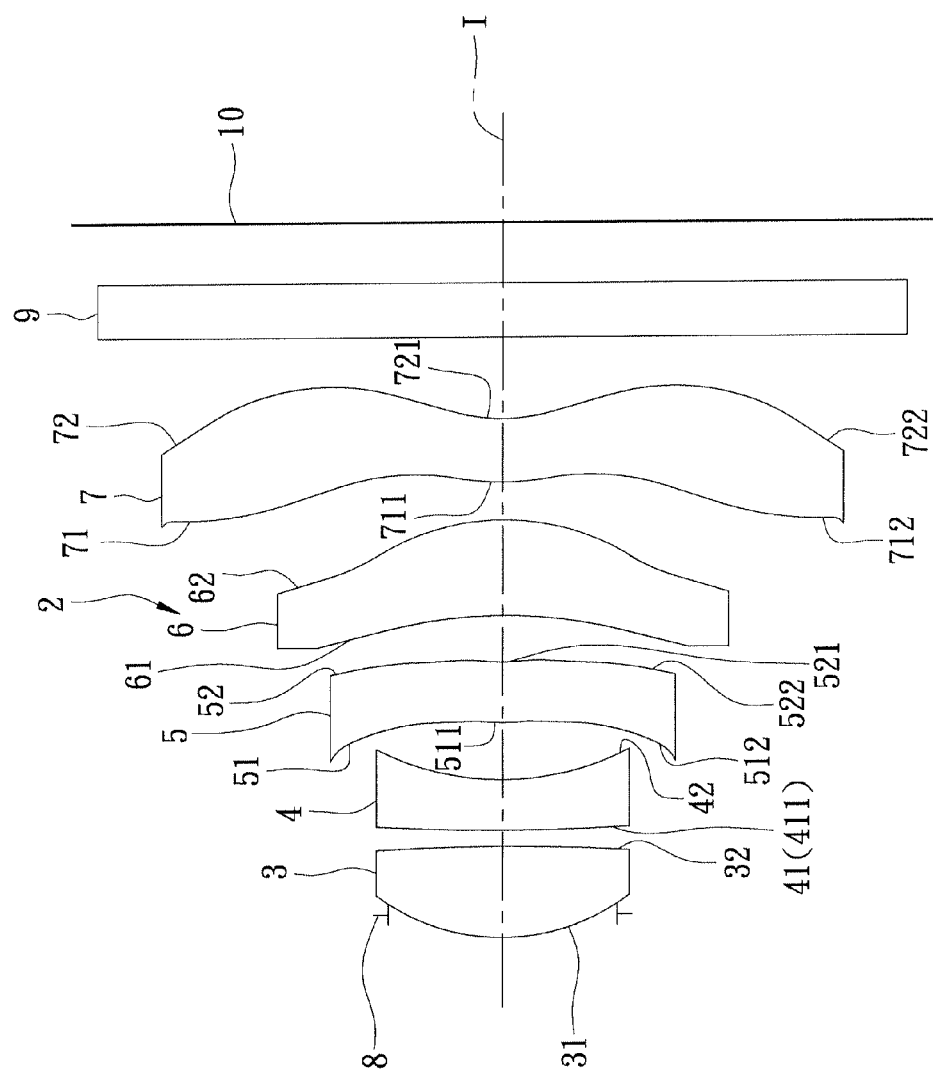
FIG. 5 is a schematic diagram that illustrates the second preferred embodiment of an imaging lens according to the present invention.
Figure 8:
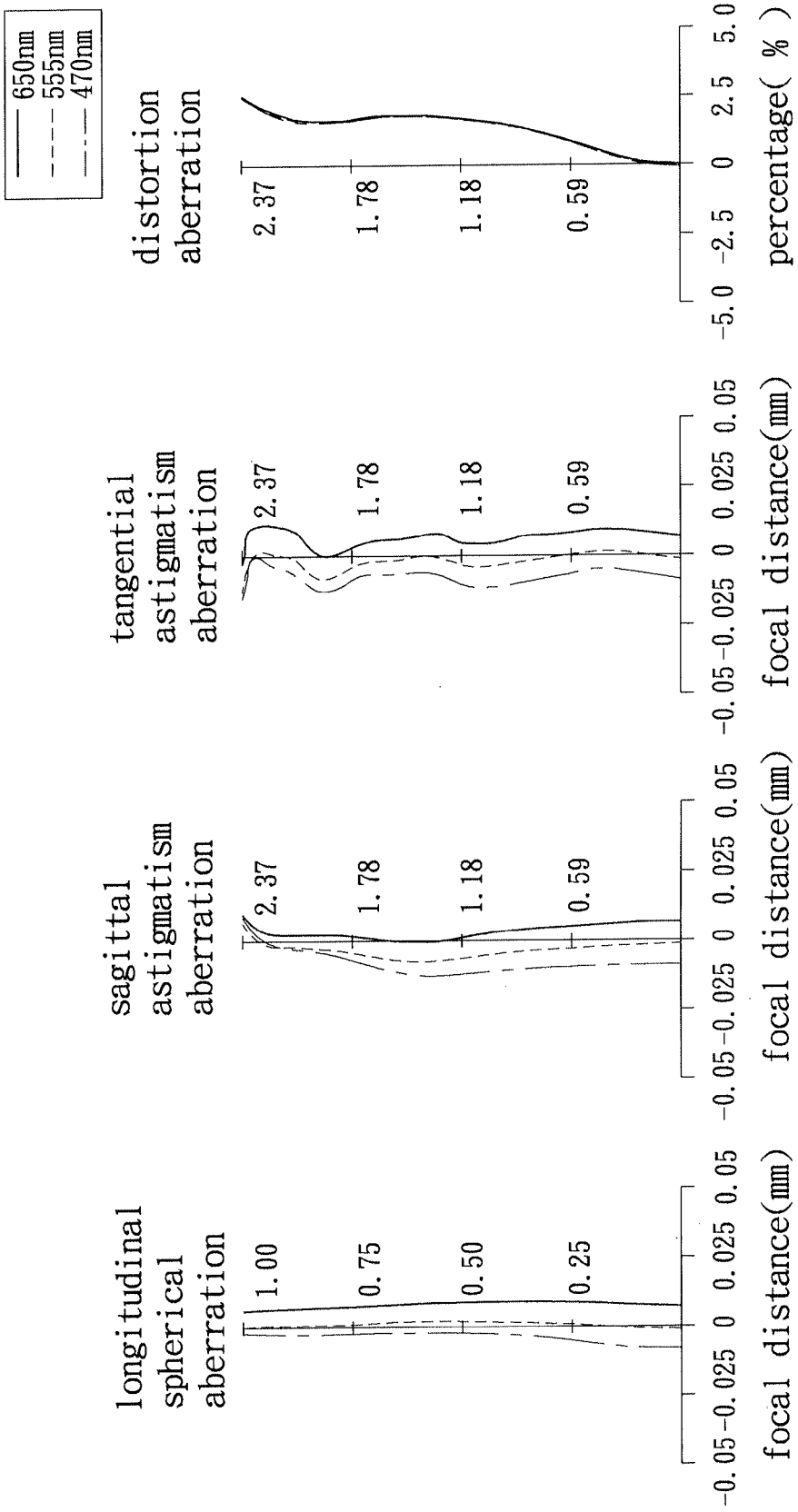
FIGS. 8(a) to 8(d) show different optical characteristics of the imaging lens of the second preferred embodiment.

Referring to FIG. 5, the difference between the first and second preferred embodiments resides in that, in the second preferred embodiment, the image-side surface 32 of the first lens element 31 is a convex surface, and the imaging lens 2 has an overall system focal length of 3.25285 mm and an HFOV of 35.18°.

Relationships among some optical parameters corresponding to the second preferred embodiment are as follows:

$T_2/G_{all\text{-}air}=0.33$ $T_3/G_{all\text{-}air}=0.40$ $|v_2-v_3|=2.76061$ $f_4/G_{all\text{-}air}=5.59827$ Shown in FIG. 6 is a table that shows values of some optical parameters corresponding to the surfaces 31-71, 32-72 of the second preferred embodiment.

Shown in FIG. 7 is a table that shows values of some optical parameters of the optical equation mentioned hereinabove corresponding to the second preferred embodiment.

FIGS. 8(a) to 8(d) show simulation results corresponding to longitudinal spherical aberration, sagittal astigmatism aberration, tangential astigmatism aberration, and distortion aberration of the second preferred embodiment, respectively. It is apparent that the second preferred embodiment is able to achieve low spherical, chromatic aberrations and distortion even when the system length is reduced down to 4 mm.

Figure 9:
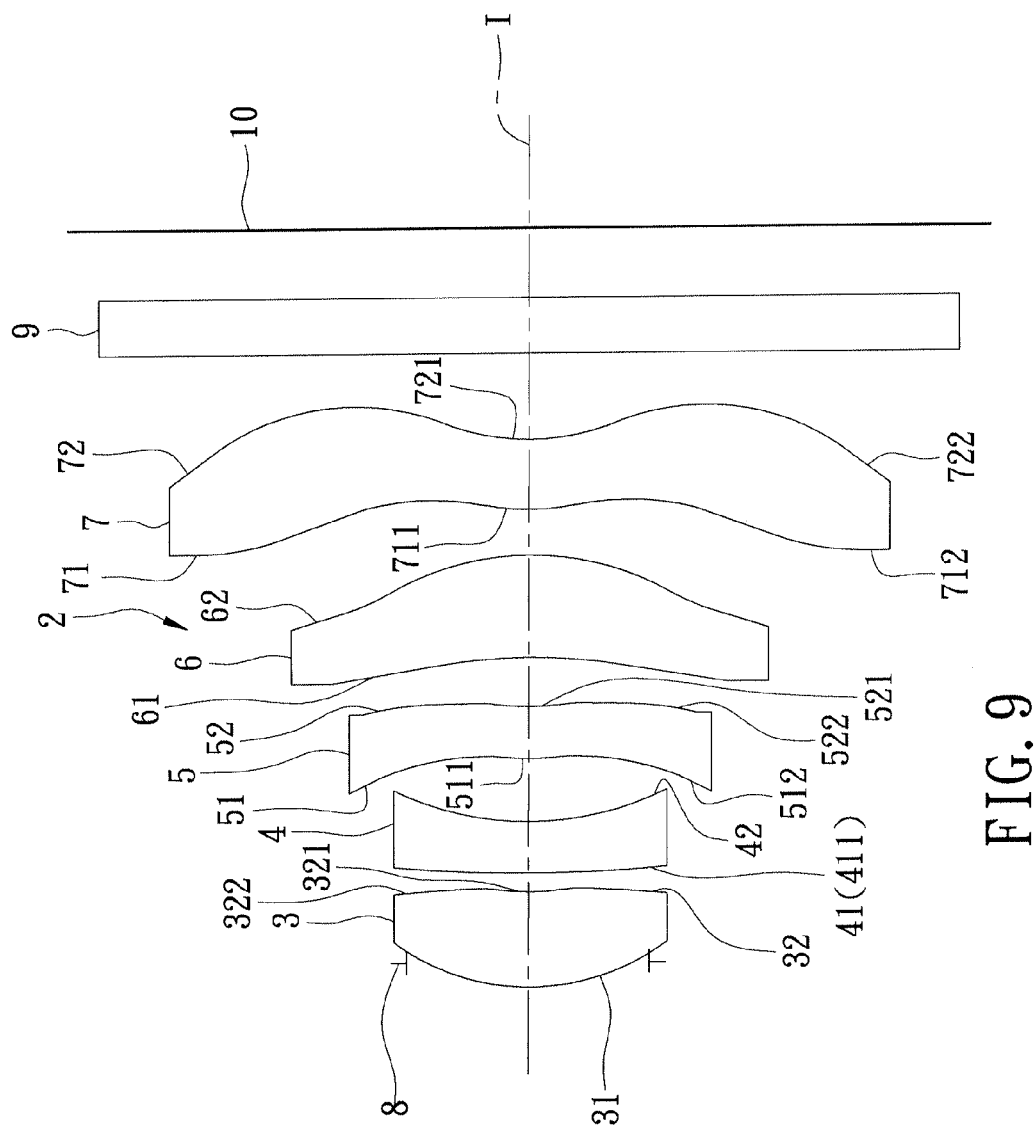
FIG. 9 is a schematic diagram that illustrates the third preferred embodiment of an imaging lens according to the present invention.
Figure 12:
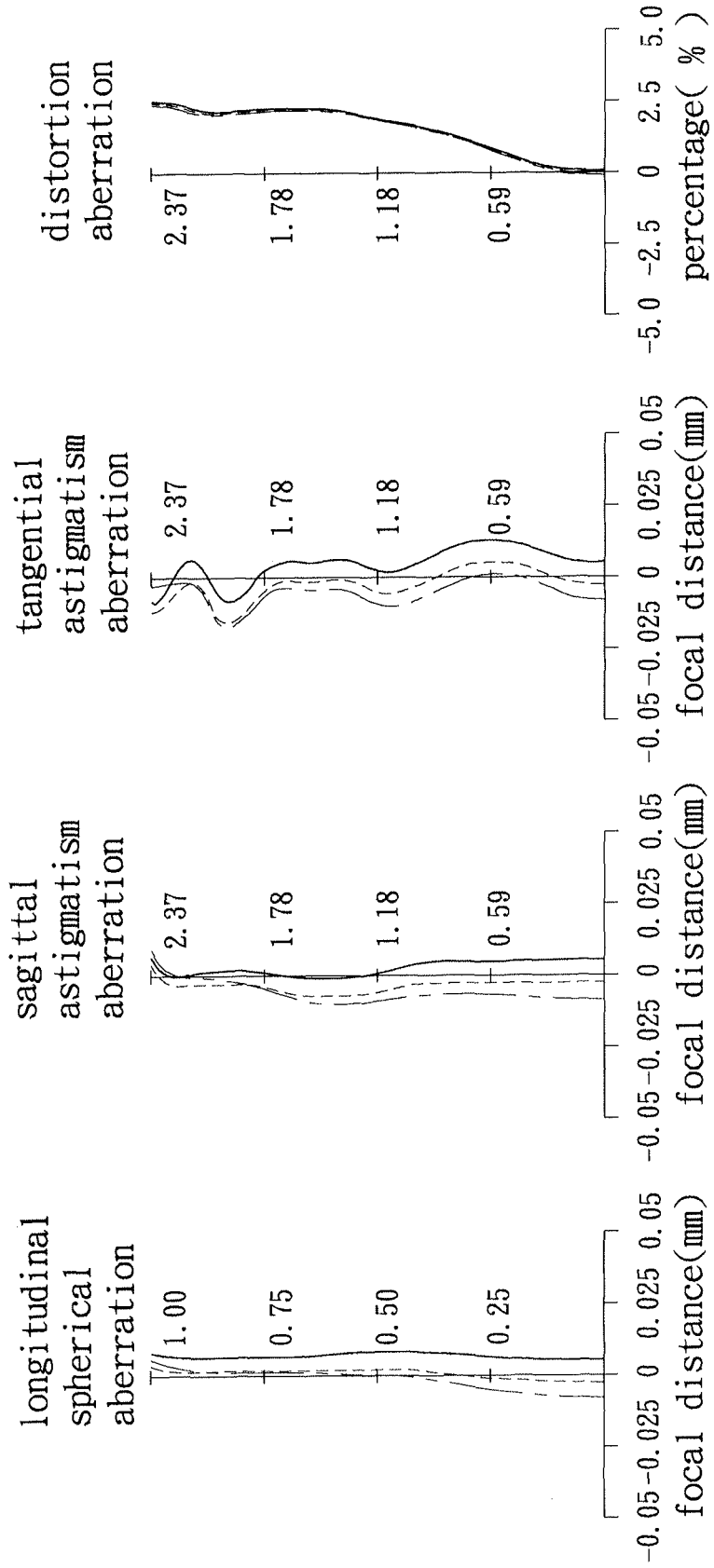
FIGS. 12(a) to 12(d) show different optical characteristics of the imaging lens of the third preferred embodiment.

Shown in FIG. 9 is the third preferred embodiment, which, in comparison with the first preferred embodiment, has an overall system focal length of 3.25954 mm and an HFOV of 35.12°.

Relationships among some optical parameters corresponding to the third preferred embodiment are as follows:

$T_2/G_{all\text{-}air}=0.40$ $T_3/G_{all\text{-}air}=0.49$ $|v_2-v_3|=0.00$ $f_4/G_{all\text{-}air}=6.76944$ Shown in FIG. 10 is a table that shows values of some optical parameters corresponding to the surfaces 31-71, 32-72 of the third preferred embodiment.

Shown in FIG. 11 is a table that shows values of some optical parameters of the abovementioned optical equation corresponding to the third preferred embodiment.

Referring to 12(a) to 12(d), the third preferred embodiment is also able to achieve relatively good optical performance while reducing the system length down to 4 mm.

Figure 13:
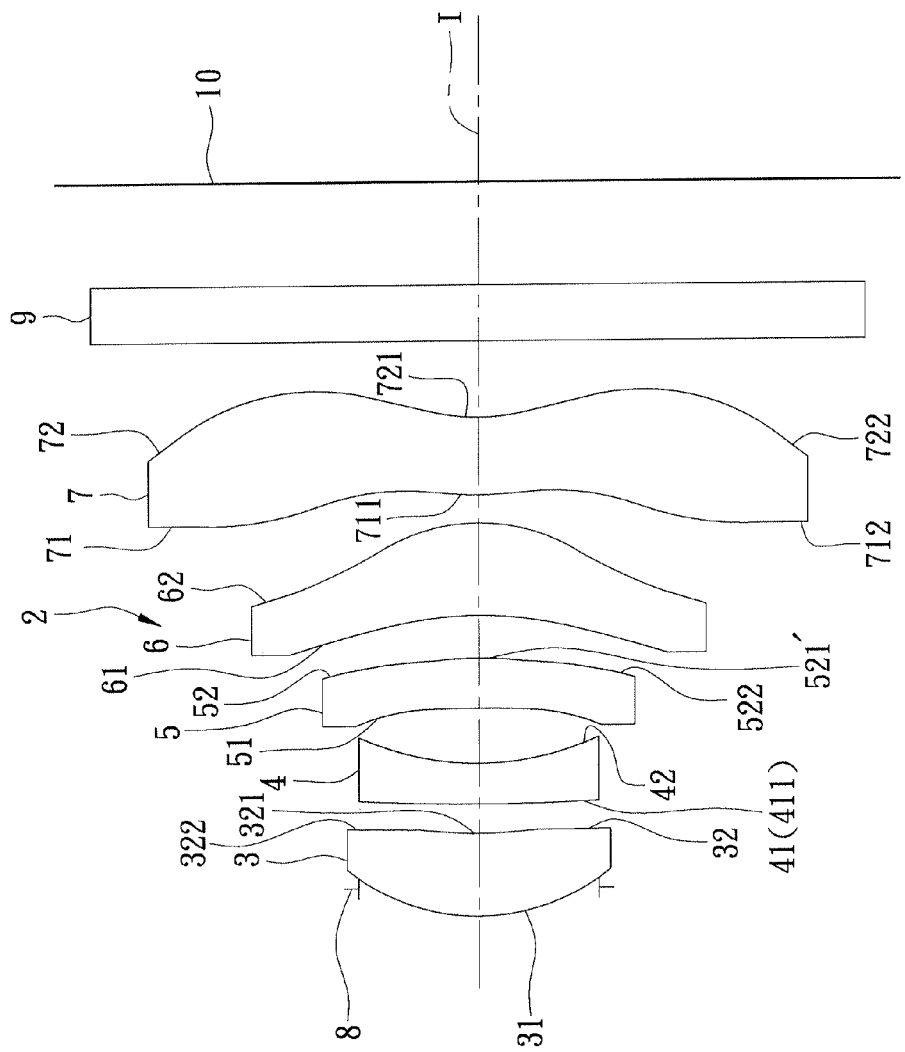
FIG. 13 is a schematic diagram that illustrates the fourth preferred embodiment of an imaging lens according to the present invention.
Figure 16:
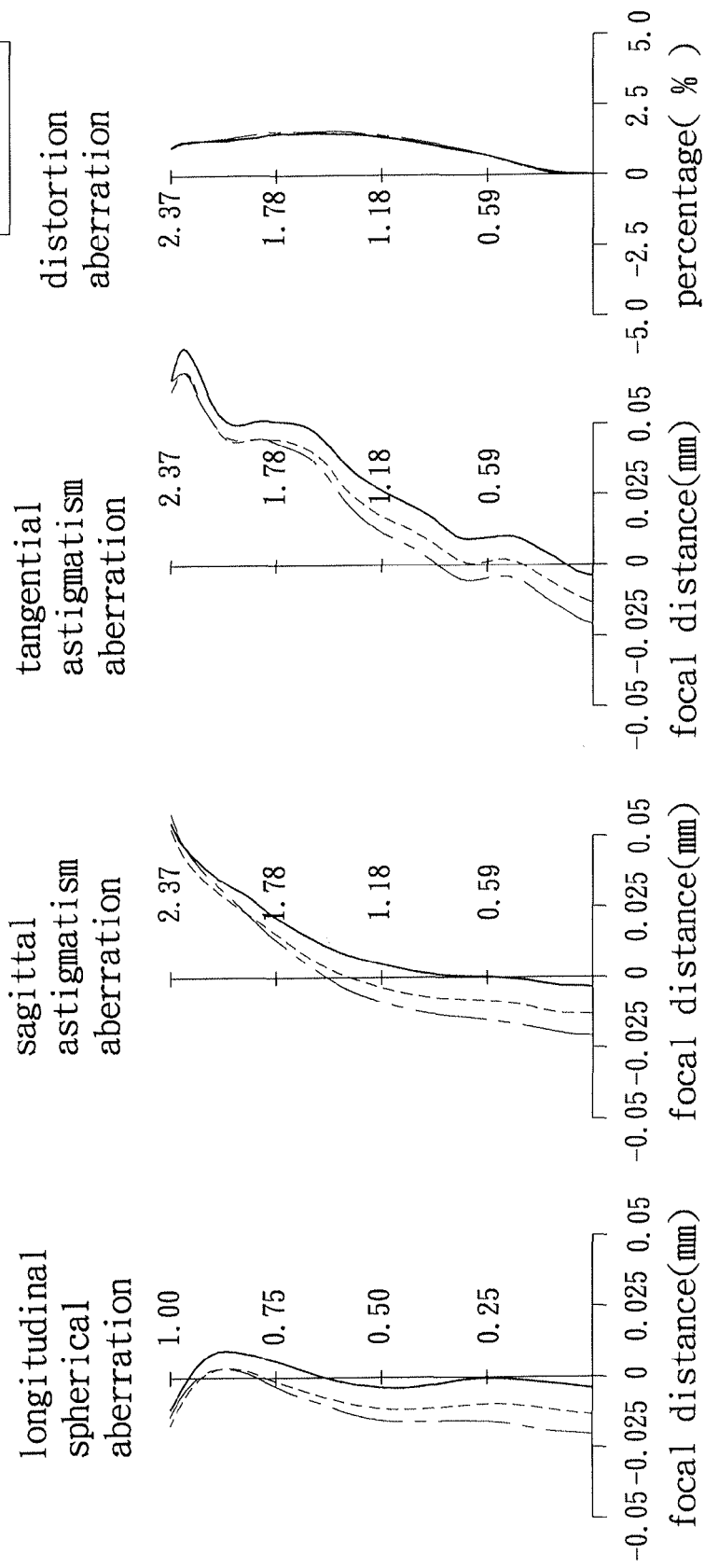
FIGS. 16(a) to 16(d) show different optical characteristics of the imaging lens of the fourth preferred embodiment.

Referring to FIG. 13, the difference between the first and fourth preferred embodiments of this invention resides in that, in the fourth preferred embodiment, the object-side surface 51 of the third lens element 5 is a concave surface, and the image-side surface 52 of the same is formed with a convex portion 521', instead of the concave portion 521, in the vicinity of the optical axis (I). In comparison with the first preferred embodiment, the imaging lens 2 of this embodiment has an overall system focal length of 3.36 mm and an HFOV of 34.64°.

Relationships among some optical parameters corresponding to the fourth preferred embodiment are as follows:

$T_2/G_{all\text{-}air}=0.28975$ $T_3/G_{all\text{-}air}=0.35319$ $|v_2-v_3|=0.00$ $f_4/G_{all\text{-}air}=5.44178$ Shown in FIG. 14 is a table that shows values of some optical parameters corresponding to the surfaces 31-71, 32-72 of the fourth preferred embodiment.

Shown in FIG. 15 is a table that shows values of some optical parameters of the abovementioned optical equation corresponding to the fourth preferred embodiment.

Referring to 16(a) to 16(d), it is apparent that the fourth preferred embodiment is able to achieve low spherical, chromatic aberrations and distortion even when the system length is reduced down to 4 mm.

Shown in FIG. 17 is a table that shows some of the aforesaid relationships corresponding to each of the preferred embodiments for comparison.

Effects of the various optical parameters on the imaging quality are described hereinafter.

When the imaging lens 2 satisfies the relationships of $0.28<T_2/G_{all\text{-}air}<0.48$, $0.30<T_3/G_{all\text{-}air}<0.50$, and $5.0<f_4/G_{all\text{-}air}<7.0$, the system length may be effectively reduced without significantly compromising the optical performance. When the imaging lens 2 fails to satisfy these relationships, a thickness of one of the second lens element 4 and the third lens element 5 may be too small and/or the sum of the widths of the clearances among the lens elements 3-7 may be too large ($T_2/G_{all-air}$<0.28, $T_3/G_{all-air}$<0.3, and $f_4/G_{all-air}$<5), the former of which may increase difficulty of manufacturing, and the latter of which may increase difficulty of reducing the system length. Alternatively, the thickness of one of the second lens element 4 and the third lens element 5 may be too large and/or the sum of the widths of the clearances among the lens elements 3-7 may be too small ($T_2/G_{all-air}$>0.48, $T_3/G_{all-air}$>0.5, and $f_4/G_{all-air}$>7), which may significantly compromise the optical performance of the imaging lens 2.

Preferably, the imaging lens 2 satisfies 0.28<$T_2/G_{all-air}$<0.42.

When the imaging lens 2 satisfies $|v_2-v_3|$<10, a difference between Abbe numbers of the second and third lens elements 4, 5 is sufficiently small such that the second and third lens elements 4, 5 may cooperate to provide a negative refractive power for matching the refractive powers of the remaining lens elements 3, 6, 7.

By virtue of the positive refractive power of the first lens element 3, the negative refractive power of the second lens element 4, and the Abbe numbers of the second and third lens elements 4, 5, aberrations attributed to the first lens element 3 are relative reduced. Moreover, by virtue of the negative refractive power of the third lens element 5, the imaging lens 2 is able to achieve the effect of field curvature correction. Furthermore, the convex portion 522 of the image-side surface 52 of the third lens element 5, the concave object-side surface 61 of the fourth lens element 6, and the convex portion 711 of the object-side surface 71 of the fifth lens element 7 may be matched in design to cooperatively reduce aberration and to achieve a better imaging quality.

Through disposing the aperture stop 8 at the object-side surface 31 of the first lens element 3, off-axis light may enter the image plane 10 in a quite horizontal direction, thereby facilitating length reduction of imaging lens 2.

Since the imaging lens 2 of the present invention satisfies the aforementioned relationships among the optical parameters "$T_2$", "$T_3$", "$G_{all-air}$", and "$f_4$", the imaging lens 2 is able to achieve reduced spherical aberration, which, together with the surface configurations of the lens elements 3-7, enables the imaging lens 2 to achieve reduced spherical and chromatic aberrations even when the overall system length is reduced to 4 mm.

Figure 18:
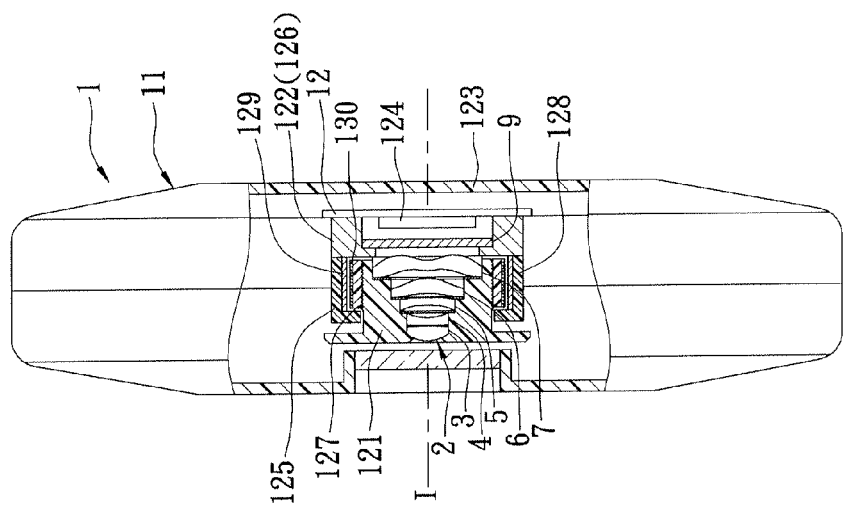
FIG. 18 is a schematic partly sectional view to illustrate a first exemplary application of the imaging lens of the present invention.

Shown in FIG. 18 is a first exemplary application of the imaging lens 2, in which the imaging lens 2 is disposed in a housing 11 of an electronic apparatus 1 (such as a mobile phone), and forms a part of an imaging module 12 of the electronic apparatus 1. The imaging module 12 includes a barrel 121 whereat the imaging lens 2 is disposed, a holder unit 122 on which the barrel 121 is disposed, a substrate 123 on which the holder unit 122 is disposed, and an image sensor 124 disposed on the substrate 123 and at the image plane 10 of the imaging lens 2, and operatively associated with the imaging lens 2 for capturing images.

Figure 19:
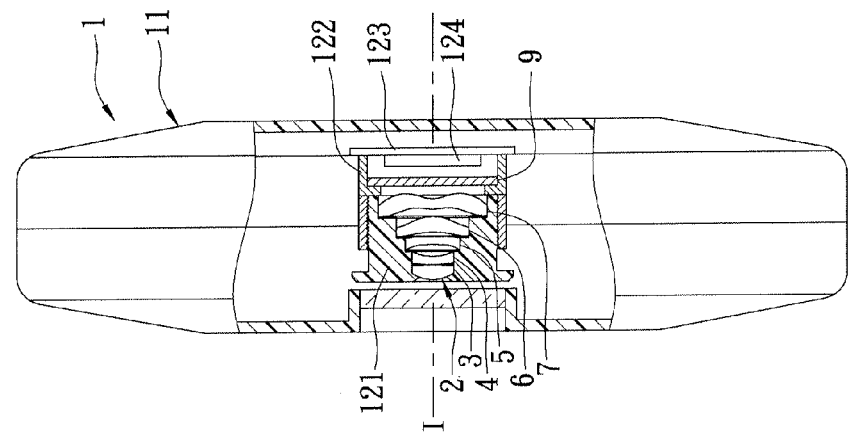
FIG. 19 is a schematic partly sectional view to illustrate a second exemplary application of the imaging lens of the present invention.

Shown in FIG. 19 is a second exemplary application, which differs from the first exemplary application in that the holder unit 122 includes a voice-coil motor (VCM) 125 on which the barrel 121 is disposed, and a sensor seat 126. The VCM 125 includes a first portion 127 sleeved onto the barrel 121 and movable along the optical axis (I), a second portion 128 disposed on the sensor seat 126 and disposed at an outer side of the first portion 127, a magnet 129 disposed on the second portion 128 and interposed between the first and second portions 127, 128, and a coil 130 wound on the first portion 127.

The first portion 127 is movable, together with the imaging lens 2 in the barrel 121, along the optical axis (I) for focusing of the imaging lens 2. The optical filter 9, on the other hand, is disposed on the sensor seat 126. Other components of the electronic apparatus 1 of the second exemplary application are identical in configuration and structure to those of the first exemplary application, and will not be described hereinafter for the sake of brevity.

Figure 20:
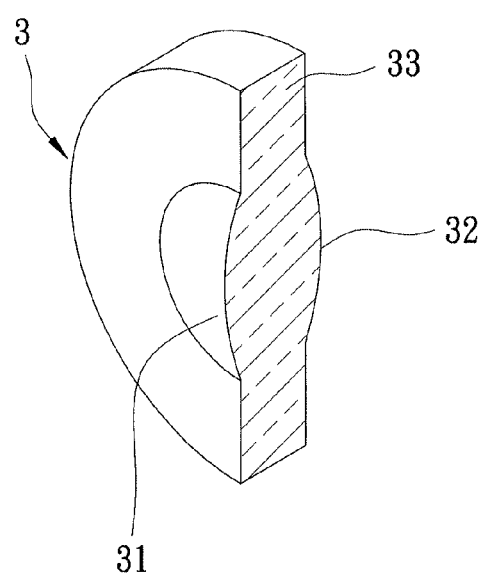
FIG. 20 is a perspective cutaway view to illustrate an extending portion of a first lens element of the imaging lens of the present invention.

Referring to FIG. 20, during manufacture, the first lens element 3 may be formed with an extending portion 33, which may be flat or stepped in shape. In terms of function, while the object-side and image-side surfaces 31, 32 are configured to enable passage of light through the first lens element 3, the extending portion 33 merely serves to provide the function of installation and does not contribute toward passage of light through the first lens element 3. The other lens elements 4-7 may also be formed with extending portions similar to that of the first lens element 3.

In summary, with the system length of the imaging lens 2 reduced to below 4 mm without compromising optical performance, the imaging lens 2 of the present invention is suitable for use in various electronic apparatuses with relatively small dimensions, such as those exemplified in the above exemplary applications. Since dimensions of the electronic apparatuses are reduced, the amount of material and hence cost required for manufacturing the electronic apparatuses are also reduced.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, first, second, third, fourth, and fifth lens elements arranged from an object side to an image side in the given order, wherein:
   said first lens element has a positive refractive power;
   said second lens element has a negative refractive power;
   said third lens element has a negative refractive power, and has an image-side surface that faces toward the image side and that has a first convex portion in a vicinity of a periphery of said third lens element;
   said fourth lens element has an object-side surface facing toward the object side, said object-side surface of said fourth lens element being a concave surface;
   said fifth lens element has an object-side surface and an image-side surface that face toward the object side and the image side, respectively, said object-side surface of said fifth lens element having a first convex portion in a vicinity of an optical axis of said imaging lens, said image-side surface of said fifth lens element having a concave portion in a vicinity of the optical axis and a convex portion in a vicinity of a periphery of said fifth lens element;
   said imaging lens does not include any lens element with refractive power other than said first, second, third, fourth, and fifth lens elements; and
   said second lens element further has an image-side surface facing toward the image side, and said imaging lens satisfies 0.28<$T_2/G_{all-air}$<0.48, where:
   "$T_2$" represents a distance between said object-side surface and said image-side surface of said second lens element at the optical axis; and
   "$G_{all-air}$" represents a sum of widths of a clearance between said first and second lens elements at the optical axis, a clearance between said second and third lens elements at the optical axis, a clearance between said third and fourth lens elements at the optical axis, and a clearance between said fourth and fifth lens elements at the optical axis.

2. The imaging lens as claimed in claim 1, wherein said second lens element has an object-side surface facing toward the object side, and having a convex portion in a vicinity of a periphery of said second lens element.

3. The imaging lens as claimed in claim 1, wherein said third lens element further has an object-side surface facing toward the object side, and said imaging lens further satisfies $0.30 < T_3/G_{all-air} < 0.50$, where "$T_3$" represents a distance between said object-side surface and said image-side surface of said third lens element at the optical axis.

4. The imaging lens as claimed in claim 3, wherein said imaging lens further satisfies $5.0 < f_4/G_{all-air} < 7.0$, where "$f_4$" represents a focal length of said fourth lens element.

5. The imaging lens as claimed in claim 4, wherein said imaging lens further satisfies $|v_2 - v_3| < 10.0$, where "$v_2$" and "$v_3$" represent Abbe numbers of said second and third lens elements, respectively.

6. The imaging lens as claimed in claim 5, wherein said imaging lens further satisfies $0.28 < T_2/G_{all-air} < 0.42$.

7. The imaging lens as claimed in claim 5, wherein:
said first lens element has an object-side surface facing toward the object side, said object-side surface of said first lens element being a convex surface;
said second lens element further has an image-side surface facing toward the image side, said image-side surface of said second lens element being a concave surface, said object-side surface of said second lens element being a convex surface;
said fourth lens element further has an image-side surface facing toward the image side, said image-side surface of said fourth lens element being a convex surface; and
said object-side surface of said fifth lens element further has a second convex portion formed in a vicinity of said periphery of said fifth lens element.

8. The imaging lens as claimed in claim 7, wherein:
said first lens element further has an image-side surface facing toward the image side, and having a concave portion that is in a vicinity of the optical axis and a convex portion that is in a vicinity of a periphery of said first lens element;
said third lens element further has an object-side surface facing toward the object side, and having a convex portion that is in a vicinity of the optical axis and a concave portion that is in a vicinity of said periphery of said third lens element, said image-side surface of said third lens element further having a concave portion formed in a vicinity of the optical axis; and
said fourth lens element has a positive refractive power, and said fifth lens element has a negative refractive power.

9. The imaging lens as claimed in claim 7, wherein:
said first lens element further has an image-side surface facing toward the image side, said image-side surface of said first lens element being a convex surface;
said third lens element further has an object-side surface facing toward the object side, and having a convex portion that is in a vicinity of the optical axis and a concave portion that is in a vicinity of said periphery of said third lens element, said image-side surface of said third lens element further having a concave portion formed in a vicinity of the optical axis; and
said fourth lens element has a positive refractive power, and said fifth lens element has a negative refractive power.

10. The imaging lens as claimed in claim 7, wherein:
said first lens element further has an image-side surface facing toward the image side, and having a concave portion that is in a vicinity of the optical axis and a convex portion that is in a vicinity of a periphery of said first lens element;
said third lens element further has an object-side surface facing toward the object side, said object-side surface of said third lens element being a concave surface, said image-side surface of said third lens element further having a second convex portion in a vicinity of the optical axis; and
said fourth lens element has a positive refractive power, and said fifth lens element has a negative refractive power.

11. The imaging lens as claimed in claim 1, wherein said imaging lens satisfies $|v_2 - v_3| < 10.0$, where "$v_2$" and "$v_3$" represent Abbe numbers of said second and third lens elements, respectively.

12. The imaging lens as claimed in claim 1, wherein said imaging lens satisfies $5.0 < f_4/G_{all-air} < 7.0$, where:
"$f_4$" represents a focal length of said fourth lens element.

13. An electronic apparatus comprising:
a housing; and
an imaging module disposed in said housing, and including said imaging lens as claimed in claim 1, a barrel whereat said imaging lens is disposed, a holder unit on which said barrel is disposed, a substrate on which said holder unit is disposed, and an image sensor disposed on said substrate and at the image side and operatively associated with said imaging lens for capturing images.

14. The electronic apparatus as claimed in claim 13, wherein said holder unit includes a portion movable along the optical axis of said imaging lens, said barrel being disposed on said portion of said holder unit.

15. An imaging lens comprising an aperture stop, first, second, third, fourth, and fifth lens elements arranged from an object side to an image side in the given order, wherein:
said first lens element has a positive refractive power;
said second lens element has a negative refractive power;
said third lens element has a negative refractive power, and has an image-side surface that faces toward the image side and that has a first convex portion in a vicinity of a periphery of said third lens element;
said fourth lens element has an object-side surface facing toward the object side, said object-side surface of said fourth lens element being a concave surface;
said fifth lens element has an object-side surface and an image-side surface that face toward the object side and the image side, respectively, said object-side surface of said fifth lens element having a first convex portion in a vicinity of an optical axis of said imaging lens, said image-side surface of said fifth lens element having a concave portion in a vicinity of the optical axis and a convex portion in a vicinity of a periphery of said fifth lens element;
said imaging lens does not include any lens element with refractive power other than said first, second, third, fourth, and fifth lens elements; and
said third lens element further has an object-side surface facing toward the object side, and said imaging lens satisfies $0.3 < T_3/G_{all-air} < 0.5$, where:
"$T_3$" represents a distance between said object-side surface and said image-side surface of said third lens element at the optical axis; and
"$G_{all-air}$" represents a sum of widths of a clearance between said first and second lens elements at the optical axis, a clearance between said second and third lens elements at the optical axis, a clearance between said third and fourth lens elements at the optical axis, and a clearance between said fourth and fifth lens elements at the optical axis.

16. The imaging lens as claimed in claim 15, wherein said imaging lens satisfies $|v_2-v_3|<10.0$, where "$v_2$" and "$v_3$" represent Abbe numbers of said second and third lens elements, respectively.

17. The imaging lens as claimed in claim 15, wherein said imaging lens satisfies $5.0<f_4/G_{all\text{-}air}<7.0$, where:

"$f_4$" represents a focal length of said fourth lens element.

* * * * *

UNITED STATES PATENT AND TRADEMARK OFFICE
CERTIFICATE OF CORRECTION

PATENT NO.         : 8,953,255 B2                                    Page 1 of 1
APPLICATION NO.    : 13/617632
DATED              : February 10, 2015
INVENTOR(S)        : Kuo-Wen Chang et al.

It is certified that error appears in the above-identified patent and that said Letters Patent is hereby corrected as shown below:

On the Title Page, Item (75) Inventor I-Lung LU was added as co-inventor after grant of patent.

Signed and Sealed this
Twelfth Day of January, 2016

Michelle K. Lee
*Director of the United States Patent and Trademark Office*